US007447783B2

(12) United States Patent
Kutaragi et al.

(10) Patent No.: US 7,447,783 B2
(45) Date of Patent: Nov. 4, 2008

(54) COMPUTER SYSTEM AND METHOD FOR TRANSMITTING USER STATUS INFORMATION

(75) Inventors: Ken Kutaragi, Kanagawa (JP); Shinichi Okamoto, Tokyo (JP); Kazuo Miura, Kanagawa (JP)

(73) Assignee: Sony Computer Entertainment Inc. (JP)

(*) Notice: Subject to any disclaimer, the term of this patent is extended or adjusted under 35 U.S.C. 154(b) by 667 days.

(21) Appl. No.: 10/061,982

(22) Filed: Feb. 1, 2002

(65) Prior Publication Data
US 2002/0120722 A1 Aug. 29, 2002

(30) Foreign Application Priority Data

| Feb. 1, 2001 | (JP) | ............................. 2001-025532 |
| Jan. 30, 2002 | (JP) | ............................. 2002-022372 |

(51) Int. Cl.
G06F 15/16 (2006.01)
G06F 17/00 (2006.01)
G06F 7/16 (2006.01)

(52) U.S. Cl. .................... 709/229; 709/217; 473/29; 725/6

(58) Field of Classification Search ................ 709/201, 709/203, 205, 213, 218, 219, 217, 227, 229; 726/2–9; 473/29; 725/6
See application file for complete search history.

(56) References Cited

U.S. PATENT DOCUMENTS

| 5,383,112 A | | 1/1995 | Clark |
| 5,694,546 A | * | 12/1997 | Reisman ..................... 709/217 |
| 5,771,291 A | * | 6/1998 | Newton et al. .............. 713/185 |
| 5,790,664 A | | 8/1998 | Coley et al. |
| 5,857,021 A | | 1/1999 | Kataoka et al. |
| 6,070,171 A | * | 5/2000 | Snyder et al. ............... 707/203 |
| 6,110,041 A | * | 8/2000 | Walker et al. ................ 463/20 |
| 6,360,255 B1 | * | 3/2002 | McCormack et al. ........ 709/221 |
| 6,496,802 B1 | * | 12/2002 | van Zoest et al. ............. 705/14 |

(Continued)

FOREIGN PATENT DOCUMENTS

EP 0 721 263 A1 7/1996

(Continued)

OTHER PUBLICATIONS

Hartung et al., Digital Rights Management and Watermarking of Multimedia ontent for M-Commerce Application, Nov. 2000, IEEE, vol. 38, pp. 78-84.*

(Continued)

*Primary Examiner*—William C Vaughn, Jr.
*Assistant Examiner*—Joiya M. Cloud
(74) *Attorney, Agent, or Firm*—Lerner, David, Littenberg, Krumholz & Mentlik, LLP

(57) ABSTRACT

A computer system enabling mutual exchange of information between users and digital content, in a manner corresponding to each individual disk, comprises a plurality of computers each capable of being loaded with a disk having a unique disk ID, and a verification server capable of being connected with the computers via a network. Each disk has a unique ID, and the verification server has a user database for accumulating user information corresponding to the disk ID. The verification server identifies the disk based on the disk ID, and transmits data corresponding to the disk to the computer.

22 Claims, 7 Drawing Sheets

U.S. PATENT DOCUMENTS

| | | | |
|---|---|---|---|
| 6,557,054 B2 * | 4/2003 | Reisman | 710/33 |
| 6,665,489 B2 * | 12/2003 | Collart | 386/94 |
| 6,868,403 B1 * | 3/2005 | Wiser et al. | 705/51 |
| 7,096,268 B1 * | 8/2006 | Shoda et al. | 709/229 |
| 2002/0104019 A1 * | 8/2002 | Chatani et al. | 713/201 |

FOREIGN PATENT DOCUMENTS

| | | |
|---|---|---|
| EP | 0 848 526 A2 | 6/1998 |
| EP | 1 048 998 A2 | 2/2000 |
| JP | 08-023315 A | 1/1996 |
| JP | 8-37506 A | 2/1996 |
| JP | 08-185444 A | 7/1996 |
| JP | 9-134330 A | 5/1997 |
| JP | 10-116189 A | 5/1998 |
| JP | 10-177554 A | 6/1998 |
| JP | 11-328293 A | 11/1999 |
| JP | 2000-207199 A | 7/2000 |
| JP | 2000-222363 A | 8/2000 |
| JP | 2000-311083 A | 11/2000 |
| JP | 2000-315192 A | 11/2000 |
| JP | 2001-244927 A | 9/2001 |
| JP | 2001-265972 A | 9/2001 |
| WO | WO-97/01253 | 1/1997 |
| WO | WO-98/12891 | 3/1998 |
| WO | WO-99/55055 A1 | 10/1999 |
| WO | WO 9955055 * | 10/1999 |
| WO | WO-00/72119 A2 | 11/2000 |

OTHER PUBLICATIONS

Kasutani et al., Video material Archive System For Efficient Video Editing Base On Media Identification, Jun. 2004, vol. 1, pp. 727-730.*

Mary Foley, *Microsoft and Piracy: Try, Try Again*, ZDNet News, Jan. 11, 2001, http://zdnet.com.

Mary Foley, *New 'Whistler' Build Adds Anti-piracy Lock*, ZDNet News, Jan. 7, 2001, http://zdnet.com.

* cited by examiner

CONCEPTUAL DIAGRAM OF SYSTEM

CONFIGURATION OF ENTERTAINMENT APPARATUS MAIN UNIT

ONLINE SERVICE VERIFICATION (PROCESSING AT APPARATUS MAIN UNIT)

ONLINE SERVICE VERIFICATION (PROCESSING AT VERIFICATION SERVER)

COMPUTER SYSTEM AND METHOD FOR TRANSMITTING USER STATUS INFORMATION

BACKGROUND OF THE INVENTION

The present invention relates to a system enabling mutual exchange of information between users and digital content.

Conventionally, services such as upgrading, debugging, etc. of programs recorded onto recording media, such as optical disks, have been performed by distributing updated optical disks to purchasers of the previously provided disks. Also, the recording media themselves have, only been managed by the manufacturing history (version) of the program itself.

However, there is demand for carrying out services such as upgrading, debugging, etc., the programs, so as to meet the situations of individual users, in the event that the manufacturing history (version) of the program itself is the same but other factors such as user operations, devices used, and so forth, differ.

SUMMARY OF THE INVENTION

Accordingly, it is an object of the present invention to provide a system enabling mutual exchange of information between users and digital content, in a manner corresponding to each individual recording medium, such as an optical disk.

Further, it is an object of the present invention to provide a system enabling mutual exchange of information between users and digital content, in a manner corresponding to each individual recording medium, such as an optical disk, by suitably constructing a network system wherein management of verification of user IDs, device IDs, and disk IDs is performed at a verification server, and the verification server and other necessary content servers are connected.

To this end, according to a first aspect of the present invention, there is provided a computer system comprising: a plurality of computers each capable of being loaded with a recording medium having a unique recording medium ID; a server capable of being connected with the computers via a network; and a database for accumulating user information corresponding to the recording medium ID; wherein the server comprises, means for obtaining the recording medium ID from one of the plurality of computers when that one computer issues a communication request, means for identifying the recording medium based on the recording medium ID and the user information in the database, whereby communication is established between the server and a computer specified by said one of the plurality of computers in response to said identified recording medium.

In the present computer system, the computer that issues a communication request may be the same as the computer that establishes communication with the server.

In the present computer system, the computer that issues a communication request may be different from the computer that establishes communication with the server.

In the present computer system, the recording medium may contain at least one of programs and data, and the means for identifying may comprise means for identifying at least one of programs and data stored in the identified recording medium.

In the present computer system, said communication is established for uploading or downloading of one of programs and data.

The present computer system may include means for preparing data for performing at least one of upgrading and debugging for the identified at least one of programs and data, as said data for updating.

In the present computer system, said computer system further comprises means for preparing data may prepare the requested data corresponding to the status and identified recording medium; the recording medium may also contain at least one of programs and data, and the computers may each comprise means for supplying to the server the status of the at least one of programs and data stored in the recording medium.

In the present computer system, each of the computers may have unique device IDs, the user information in the database may contain information relating to the device ID, the server may further comprise means for obtaining the device ID from the computers in the event that the computers request the data and means for identifying the computer based on the device ID and the user information in the database.

In the present computer system, each user of each of the computers may have a unique user ID, the user information in the database may contain information relating to the user ID, and the server may further comprise means for obtaining the user ID from the computers in the event that the computers request the data and means for identifying the user based on the user ID and the user information in the database.

In the present computer system, the server may be connected, via a network, further to at least one content server having digital content.

In the present computer system, the server may further comprise means for performing verification of the recording medium based on the recording medium ID, and means for judging whether or not to permit providing of the digital content from the content server to the computer, based on the results of the verification.

According to a second aspect of the present invention, there is provided a computer system comprising: a plurality of computers each capable of being loaded with a recording medium storing at least one of programs and data; and a server capable of being connected with the computers via a network; wherein the computers each comprise means for supplying to the server the status of the at least one of programs and data stored in the recording medium; and wherein the server comprises means for obtaining the status from the computers in the event that the computers request data, means for preparing the requested data according to the status, and means for transmitting the requested data to the computer.

In the present computer system, the requested data may be data for updating at least one of programs and data stored in the recording medium.

In the present computer system, the server may be further connected, via a network, to at least one content server having digital content, wherein the means for preparing data may comprise means for sending the status to the content server, and the content server may comprise means for selecting the digital content according to the status and transmitting the selected digital content to the server.

According to a third aspect of the present invention, there is provides a computer system comprising: a plurality of computers each capable of being loaded with a recording medium storing at least one of programs and data; and a server capable of being connected with the computers via a network; wherein each of the computers have unique device IDs; the server comprising a database for accumulating user information corresponding to the device ID, means for obtaining the device ID from the computers in the event that the computers request data, means for identifying the computer based on the device ID and the user information in the database, means for preparing the requested data according to the identified computer, and means for transmitting the requested data to the computer.

According to a fourth aspect of the present invention, there is provided a computer system comprising: a plurality of computers each capable of being loaded with a recording medium storing at least one of programs and data; and a server capable of being connected with the computers via a network; wherein each user of each of the computers has a unique user ID; the server further comprising a database for accumulating user information corresponding to the user ID, means for obtaining the user ID from the computers in the event that the computers request the data, means for identifying the user based on the user ID and the user information in the database, means for preparing the requested data according to the identified user, and means for transmitting the requested data to the computer.

According to another aspect of the present invention, there is provided a server, capable of being mutually connected via a network with a plurality of computers each capable of being loaded with a recording medium having a unique recording medium ID, said server comprising: a database for accumulating user information corresponding to the recording medium ID; means for obtaining the recording medium ID from the computers in the event that the computers request data; means for identifying the recording medium based on the recording medium ID and the user information in the database; means for preparing the requested data according to the identified recording medium; and means for transmitting the requested data to the computer.

According to a further aspect of the present invention, there is provided a server, capable of being connected via a network with a plurality of computers each capable of being loaded with a recording medium storing at least one of programs and data, said server comprising: means for obtaining the status relating to the at least one of programs and data stored in the recording medium from the computers in the event that the computers request data; means for preparing the requested data according to the status; and means for transmitting the requested data to the computer.

According to a further aspect of the present invention, there is provided a method of processing in a computer system comprising a plurality of computers each capable of being loaded with a recording medium having a unique recording medium ID, and a server capable of being connected with said computers via a network; wherein the processing at said server comprises, a step for obtaining said recording medium ID from said computers in the event that said computers request data, a step for inputting user information corresponding to said recording medium ID from a database, a step for identifying said recording medium based on said recording medium ID and said user information, a step for preparing said requested data according to the identified recording medium, and a step for transmitting said requested data to said computer.

According to a further aspect of the present invention, there is provided a method of processing in a computer system comprising a plurality of computers each capable of being loaded with a recording medium storing at least one of programs and data, and a server capable of being connected with said computers via a network; wherein the processing at said server comprises, a step for obtaining the status relating to said at least one of programs and data stored in said recording medium from said computers in the event that said computers request data, a step for preparing said requested data according to said status, and a step for transmitting said requested data to said computer.

According to a further aspect of the present invention, there is provided a computer capable of being loaded with a recording medium storing at least one of programs and data, and capable of being connected with a server via a network; said recording medium having a unique ID, said computer comprising; means supplying at least one of an ID unique to said computer, an ID unique to said recording medium and an ID unique to said user, to said server as verification information, in the event of making a request for data to said server following operations made by a user; and means for receiving the result of verification from the server.

According to a further aspect of the present invention, there is provided a recording medium for use in a computer system which comprises a plurality of computers, said recording medium storing at least one of programs and data and being capable of being loaded into a computer, wherein the method recorded in the programs comprises; a step of managing a status relating to the at least one of programs and data stored in the recording medium, with the recoding medium ID, a step of transmitting request for data the server; a step for receiving from the server data prepared by the server as requested in response to the status, whereby the recording medium is updated in response thereto.

According to a further aspect of the present invention, there is provided a program for use in a computer system comprising a plurality of computers each capable of being loaded with a recording medium having a unique recording medium ID, and a server capable of being connected with said computers via a network; wherein the program that record the processing at said server comprises; a step for obtaining said recording medium ID from said computers in the event that said computers request data, a step for inputting user information corresponding to said recording medium ID from a database, a step for identifying said recording medium based on said recording medium ID and said user information, a step for preparing said requested data according to the identified recording medium, and a step for transmitting said requested data to said computer.

According to a further aspect of the present invention, there is provided a program for use in a computer system comprising a plurality of computers each capable of being loaded with a recording medium storing at least one of programs and data, and a server capable of being connected with said computers via a network; wherein the program that record the processing at said server comprises; a step for obtaining the status relating to said at least one of programs and data based on a unique ID given to said recording medium from said computers in the event that said computers request data, a step for preparing said requested data according to said status, and a step for transmitting said requested data to said computer.

BRIEF DESCRIPTION OF THE DRAWINGS

FIG. 8 is a table illustrating the results of comparison between a disk ID and device ID received by a verification server, and user information accumulated in a user database beforehand.

DESCRIPTION OF THE PREFERRED EMBODIMENTS

Embodiments of the present invention will now be described with reference to the attached drawings.

Figure 1:
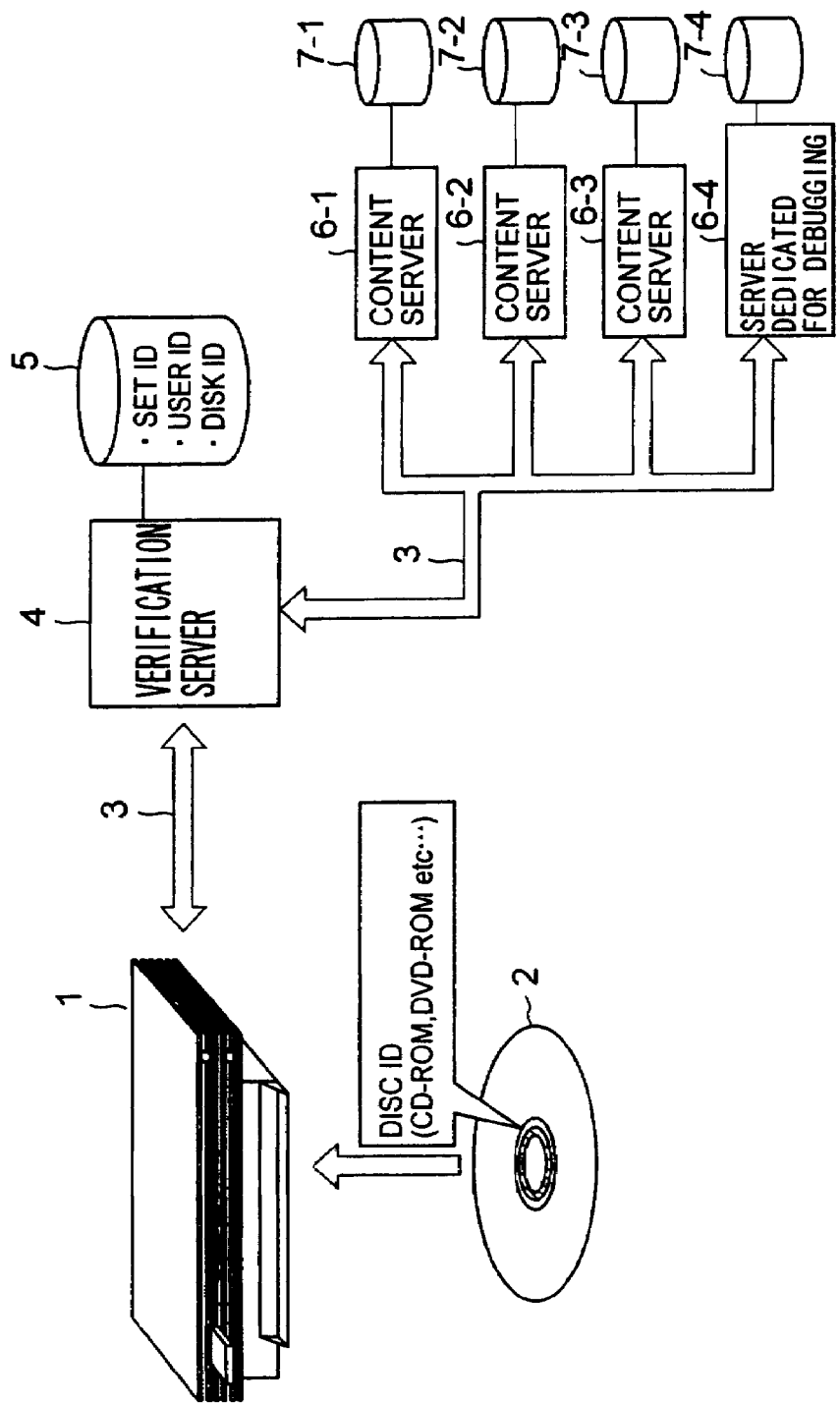
FIG. 1 is a conceptual view of the system relating to the present invention.

FIG. 1 is a conceptual diagram of the overall system according to the present embodiment, which enables mutual exchange of information between users and digital content. As shown in FIG. 1, a user terminal device 1 is connected with a verification server 4 via a network 3. The user terminal device 1 is a computer capable of being loaded (or otherwise coupled) with an optical disk, such as a CD-ROM (Compact Disk Read-Only Memory), DVD-ROM (Digital Versatile (Video) Disk ROM), or the like. The present embodiment will be described with reference to an entertainment apparatus main unit 1 represented by a game device or the like, as an example of the computer. The internal configuration of this entertainment apparatus main unit 1 will be described later with reference to FIG. 2.

The verification server 4 is suitably connected to one, two, or more content servers 6 via the network 3, in accordance with the optical disk 2 mounted on the entertainment apparatus main unit 1. Each of the content servers 6 has a database 7. At least one of the content servers 6 may be a dedicated debugging server 6-4.

The verification server 4 centrally manages content servers 6 of corporations related to this business model. Further, the verification server 4 plays the role of establishing connections between the content servers 6 of the corporations providing services and the users, based on the service requests selected by the users. Various types of digital content which can be provided to users are stored in the databases 7 which the content servers 6 have.

The verification server 4 has a user database 5. Accumulated in this user database 5 are at least disk IDs that are unique IDs given to the respective optical disks 2. Further, as desired, device ID (SET ID) information of unique IDs given to each of the entertainment apparatus main units 1, user ID (USER ID) information (which may include passwords) of unique IDs given to each of the users, and so on are accumulated in the database 5. What is accumulated in the database is, however, not limited to the illustrated data. These data are referred to as user information herein. Thus, a verification system for verifying each individual disk can be realized, as described hereinafter.

Note that other recording media may be used instead of optical disks. In the case of using another recording medium, the disk ID will be a recording medium ID, but the following description will be made with the example of a disk, having a disk ID.

Preferably used as the network 3 is a so-called broadband network, such as a television cable network, optical fiber network, xDSL (x Digital Subscriber Line), or the like. Also, already-existing or yet-to-be-constructed wide-area wireless networks, telephone-related networks for cellular telephones or PHS (Personal Handiphone System) telephones, Internet-related networks, etc., may be used as well.

One of the characteristics of the present invention is that managing verification of the user IDs, device IDs, and disks IDs, is performed at the verification server 4, and a network system 3 is constructed to connect the verification server 4 with other necessary content servers 6, so as to provide a system enabling mutual exchange of information between users and digital content for each individual disk 2.

This system is configured by first providing a verification server 4, then selecting content servers 6 necessary for the entertainment apparatus main unit 1, suitably connecting these with the verification server 4 by the network 3 and managing them.

Also, with such a system, prices for reception of data for using services by the user of the entertainment apparatus main unit 1 can be managed by configuring a billing system at the verification server 4.

Figure 2:
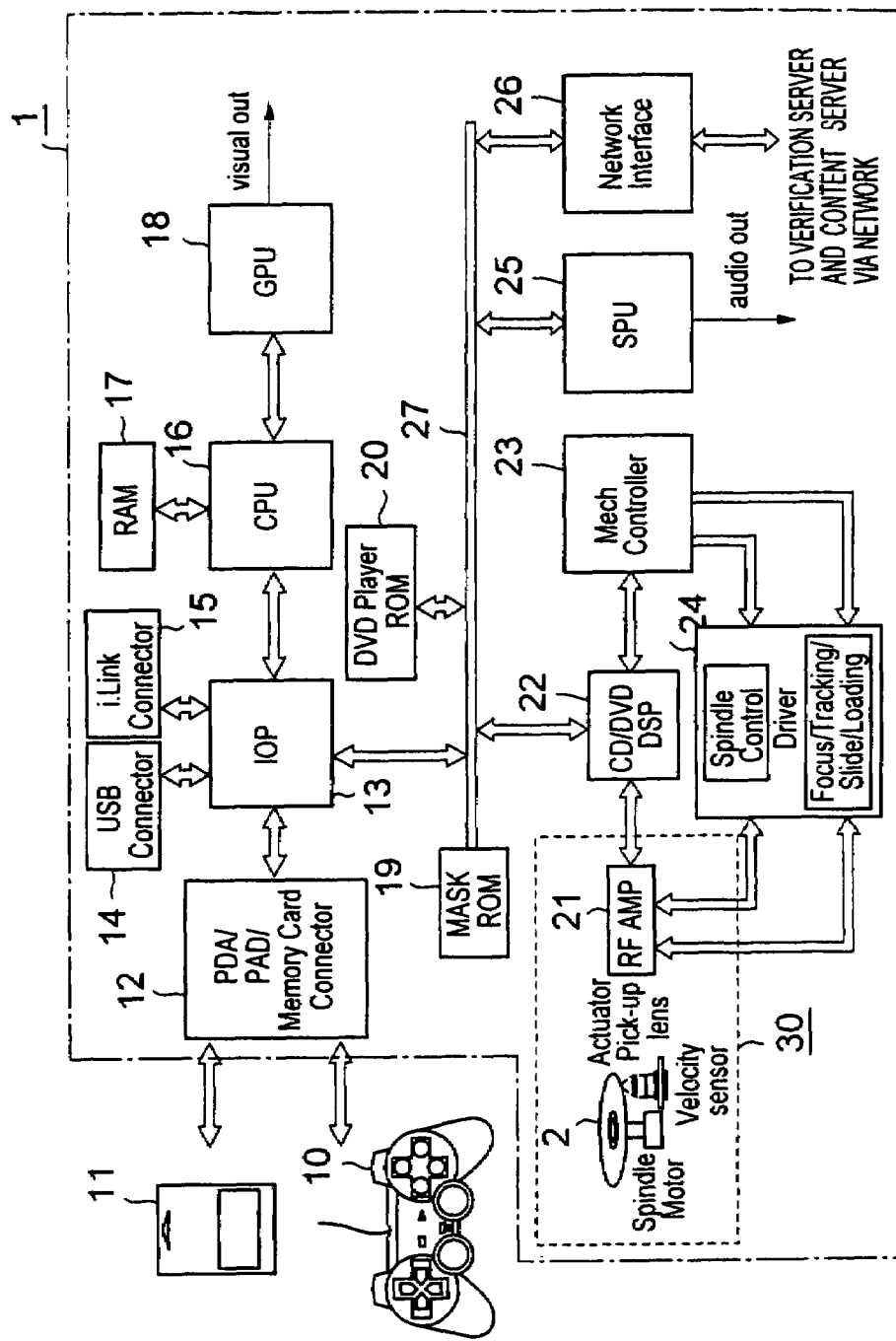
FIG. 2 is a block diagram illustrating the configuration of the entertainment apparatus main unit shown in FIG. 1.

FIG. 2 is a block diagram of the internal configuration of an entertainment apparatus main unit 1 used as the user terminal shown in FIG. 1. In the diagram, within the single-dotted broken line is the entertainment apparatus main unit 1, and within the dotted line is the disk unit 30 of the entertainment apparatus main unit 1.

The entertainment apparatus main unit 1 has a CPU 16, and the CPU 16 is connected with a main memory (RAM) 17. The CPU 16 is also connected with a graphics drawing device (GPU) 18, and picture signals from the GPU 18 are output to a display device (CRT) via a CRT-CTR (Cathode Ray Tube Controller) not shown in the drawings. Also, the CPU 16 is connected to a connector (controller (PAD)/PDA (Personal Digital Assistant)/memory card connector) 12 via an IOP (Input/Output Processor) 13 having a USB (Universal Serial Bus) connector 14, an IEEE (Institute of Electrical and Electronic Engineers) 1394 or i.LINK(R) connector 15, etc. Connected to the connector 12 are a memory card 11, a portable electronic terminal (PDA) not shown in the drawings, a controller (PAD) 10, and so forth. The memory card 11 is a type of external storage device, with disk ID, device ID, etc., stored therein, as described later.

Also, the CPU 16 is connected to a bus 27 via an IOP 13, with a MASK-ROM (Masked ROM) 19, a CD/DVD-DSP (CD/DVD Digital Signal Processor) 22, a DVD player ROM 20, an SPU (Sound Processing Unit) 25, a network interface 26, etc., connected to the bus 27. Audio signals from the SPU 25 are output to an amplifier, speaker, etc., which are not shown. The entertainment apparatus main unit 1 is connected to the network via the network interface 26, USB connector 14, i.LINK(R) connector 15, etc., and further is connected to the verification server 4, digital content servers 6, etc., via the network.

The CD/DVD-DSP 22 performs mechanical control of the disk unit 30, via a mechanical control unit 23 and driver 24. This control is made through an RF-AMP (Radio Frequency Amplifier) 21. Also, the CD/DVD-DSP 22 performs electrical control of the disk drive 30 via the RF-AMP 21.

The optical disk 2 is rotated by mechanical control of a spindle motor (not shown). Also, a pick-up lens (not shown) is driven by electrical control of an actuator (not shown) so as to record to and play information from the optical disk 2. A disk ID is stored in the optical disk 2, and this disk ID is read by a later-described method.

The system enabling mutual exchange of information between users and digital content for each individual disk 2 will be described with an example of a racing game program. Let us assume a racing game wherein the cars raced are based on actually-existing car models, and races are held on courses of varying difficulty. This racing game program is read out from an optical disk 2 set in the entertainment apparatus main unit 1, and is executed by the CPU. Note that arrangements may be made wherein the optical disk 2 stores only part of the program, or data which the program uses.

With such a racing game program, processing may become necessary to deal with:

(1) upgrading the program, data, etc.;
(2) updating the program through debugging;
(3) ranking scores from race results;
(4) entering for prizes or participating in other such campaigns carried out by the game program production company; and other such developments and activities.

Figure 3:
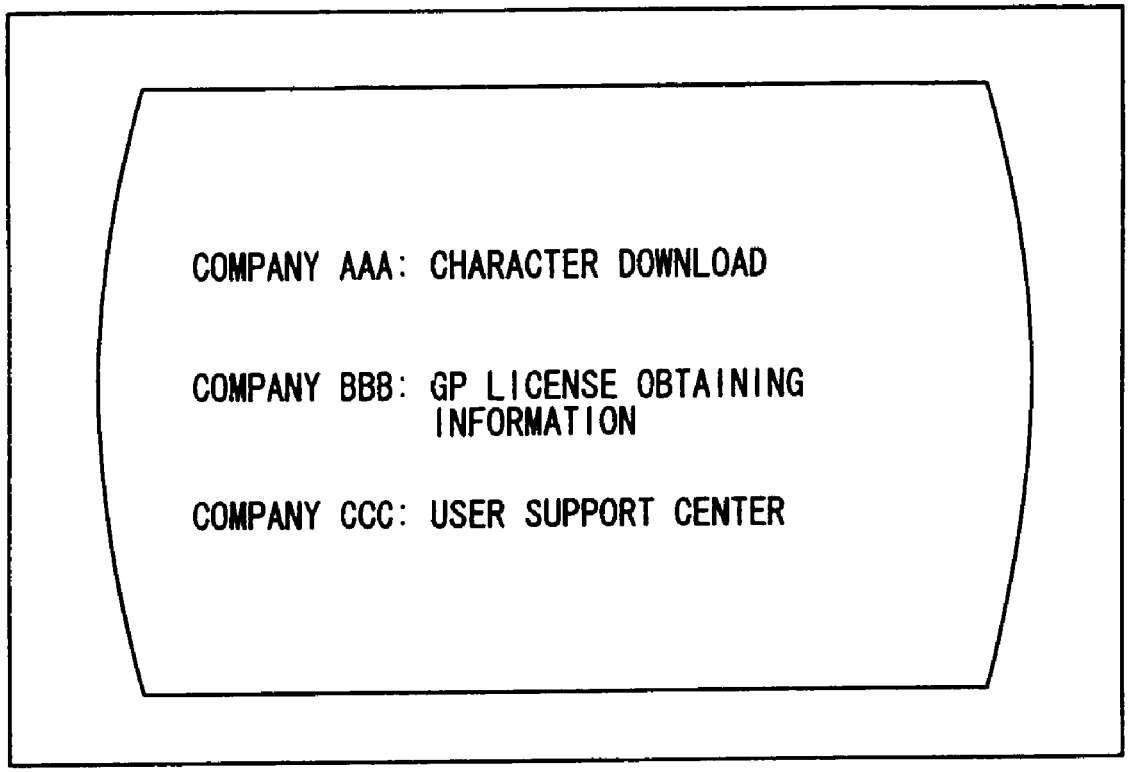
FIG. 3 is a display screen example of a portal site for an online service.

FIG. 3 is an example of a display screen for executing such a racing game (a screen displaying an image downloaded from a portal site on the verification server 4). The following is a description of the contents of the displayed image.

The item "Company AAA: Character Download" relates to downloading data relating to actually-existing car models, which are the characters in this case. It is the automobile manufacturers manufacturing the cars who have such data of actually-existing car models. Accordingly, this system is connected to the content server 6 of the automobile manufacturer via the verification server, through cooperation of the automobile manufacturer. Or, an arrangement may be made wherein, instead of the content server 6 of the automobile manufacturer, a content server 6 of a game production company which has stored data obtained from automobile manufacturers, may be used.

Upon the user operating the controller 10 and clicking on this displayed item, various car models are displayed on the display. The user selects a desired car model, and the data regarding the model is downloaded from the content server 6 of the automobile manufacturer via the verification server 4. In the event that a new model is produced and the content server 6 of the automobile manufacturer is updated, data for the new model is reflected in the game.

The item "Company BBB: GP license obtaining information" relates to ranking of scores from race game results, licensing, and so forth. The user can connect to the content server 6 of the game software producer (or vendor) by clicking on this displayed item. For example, in the event that Company BBB, which produces the game software, creates ranking of scores from race results, issues licenses according to the scores from the race results, and further puts up prizes for users to win, the user can register the racing game results, apply for a license, and enter for prizes, online via the network 3.

The item "Company CCC: User Support Center" relates to the manufacturer of the entertainment apparatus main unit 1. The user can connect to the content server 6 of the manufacturer of the entertainment apparatus main unit 1 by clicking on this displayed item. Disk ID verification is necessary for carrying out the processing, such as (1) upgrading the program, data, etc., and (2) updating the program through debugging, for each individual disk.

Figure 4:
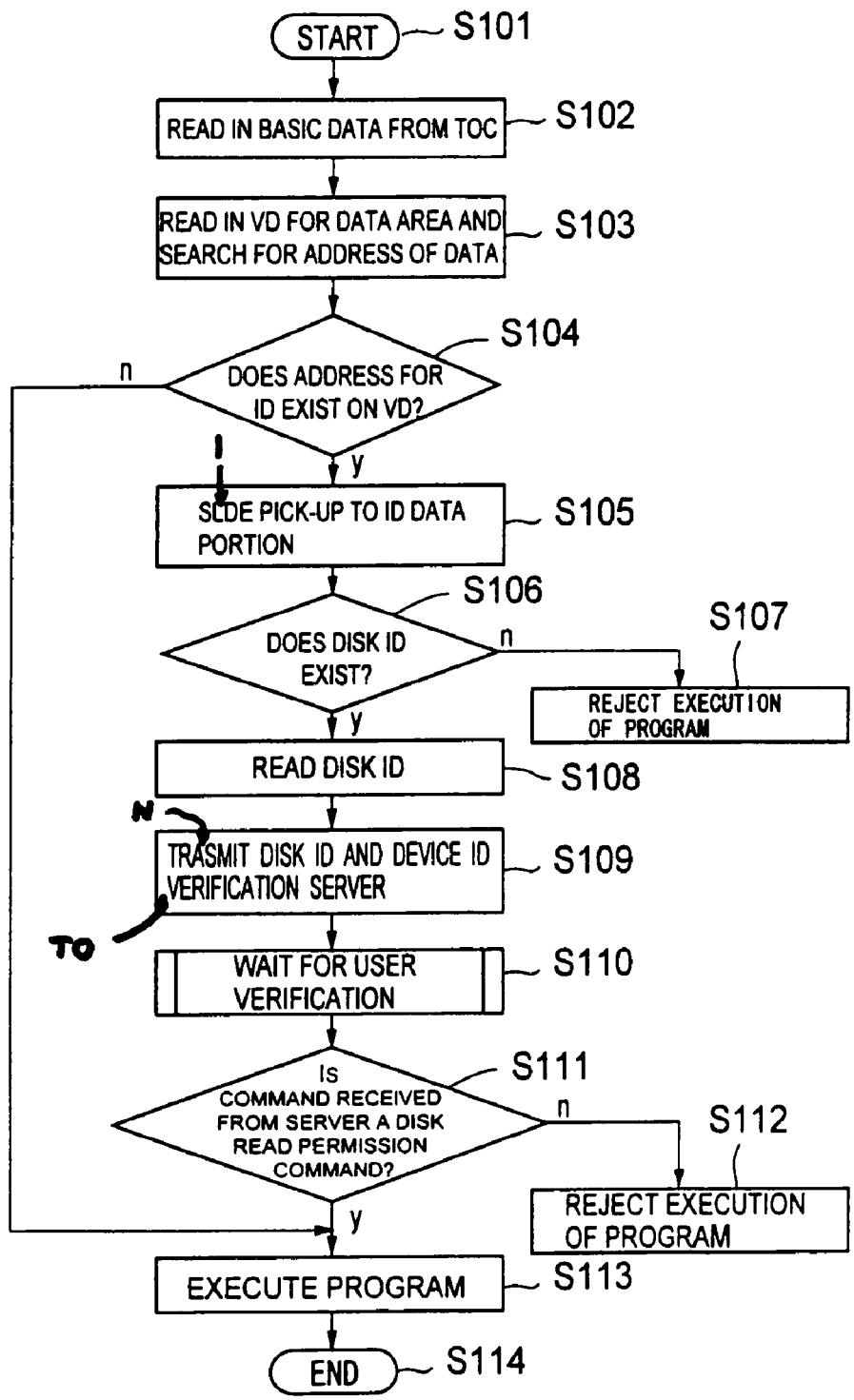
FIG. 4 is a processing flowchart for the apparatus main unit side for disk verification.
Figure 5:
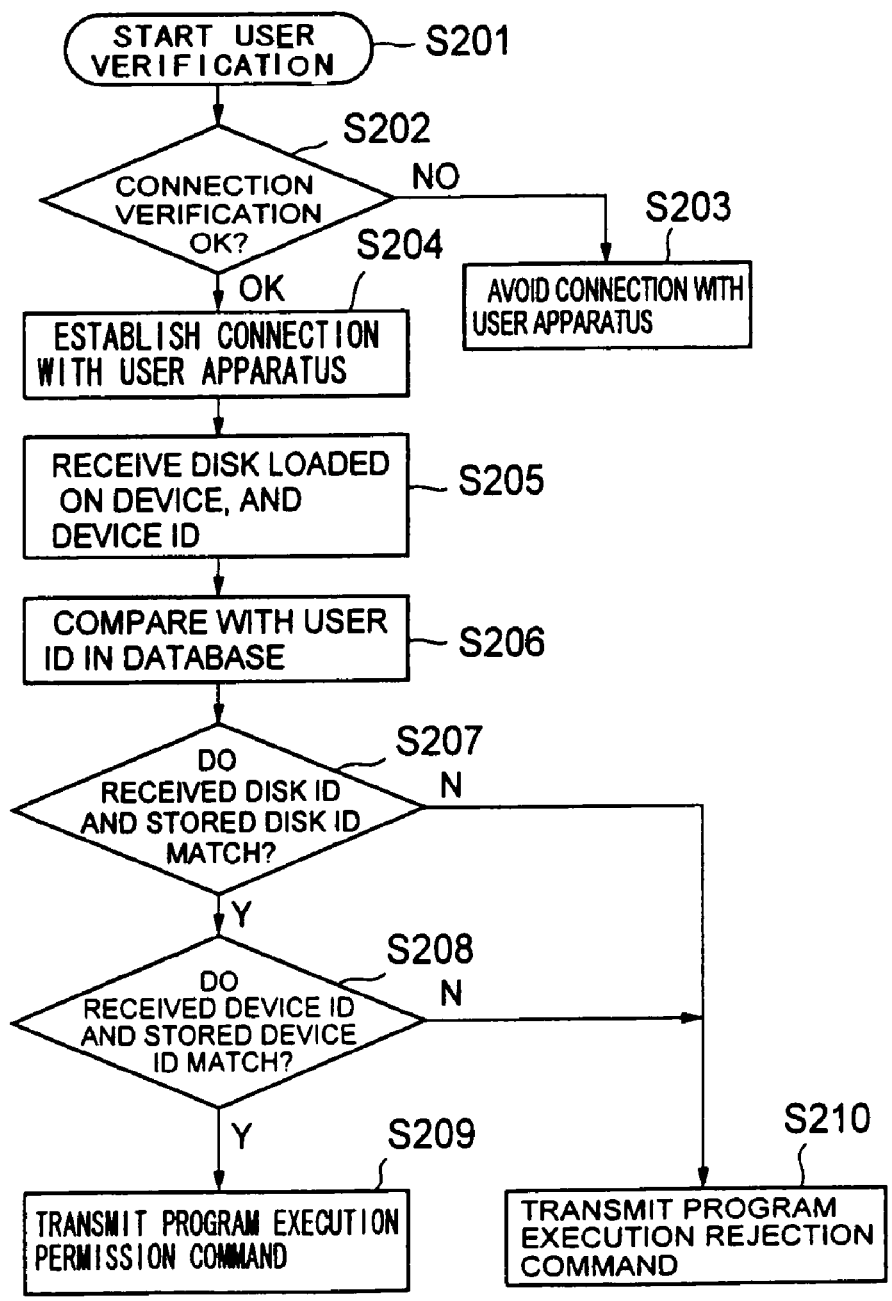
FIG. 5 is a processing flowchart for the verification server side for disk verification.

The following is a description of the processing at the entertainment apparatus main unit 1 side and the processing at the verification server 4 side in a first disk ID verification system according to the present embodiment, with reference to FIGS. 4 and 5, respectively. Note that with the present embodiment, the disk ID exists at an area other than the normal data area (e.g., on the inner side of the read-in area, on the outer side of the read-out area, etc.), and the user database 5 of the verification server 4 is assumed to have user information comprising a combination of a user ID and a device ID and a disk ID, accumulated therein beforehand.

The basic processing at the entertainment apparatus main unit 1 side shown in FIG. 4 will now be described. With the optical disk 2 used here, the disk ID is recorded in an area which is not normally the object of recording data. Information for identifying the position where the disk ID is recorded (e.g., an address) is recorded in the normal data area. An example of material used for writing the disk ID to the optical disk 2 is an organic coloring matter used with write-once optical disks. The entertainment apparatus main unit 1 reads the disk information, finds the address where the disk ID is recorded there, further reads the disk ID following this address, and transmits the disk ID to the verification server 4. This will now be described in detail.

In step S102, the entertainment apparatus main unit 1 reads in the basic data of the TOC (Table of Contents) from the loaded CD-ROM, under the control of the CPU. In step S103, the volume identifier VD (Volume Description) for the data area of the CD-ROM is read in, and the entertainment apparatus main unit 1 searches for an address describing the disk ID.

In step S104, judgment is made regarding whether or not the address of the disk ID exists in the volume identifier VD. In the event that the ID address does not exist, judgment is made that the loaded CD-ROM is not subject to protection by the disk ID verification system, the flow proceeds to step S113, and the program is executed. The entertainment apparatus main unit 1 also functions as a music CD player, movie DVD player, etc., and is not restricted to functioning as a gaming device. Accordingly, optical disks not subject to protection by the disk ID verification system (e.g., DVD-video disks, audio CDs, conventional game CDs) may be loaded on the entertainment apparatus main unit 1, and in such cases, the music or pictures are played, the game is executed, and so forth, in a straightforward manner.

In the event that the ID address exists in the volume identifier VD, in step S105, the pick-up of the optical disk drive 30 is slid toward the disk ID data portion of the CD-ROM (the portion provided on the inner side of the read-in area or on the outer side of the read-out area), following the ID address, in order to read the disk ID. Control of the sliding of the pick-up is performed by a mechanical control unit 23, based on slide control output from the CPU 16.

In step S106, the CPU 16 judges whether or not disk ID information actually exists at the disk ID data portion on the CD-ROM. In the event that disk ID information does not exist or in the event that the disk ID information cannot be read, judgment of no disk ID is passed, and the flow proceeds to step S107. In step S107, execution of the program is rejected, and is force-quit.

In the event that disk ID information actually exists at the disk ID data portion, in step S108 the entertainment apparatus main unit 1 reads the disk ID information under the control of the CPU, and stores this in the main memory.

In step S109, the CPU of the entertainment apparatus main unit 1 transmits the disk ID data to the verification server 4, via various types of communication interfaces in accordance with standards such as USB, IEEE (Institute of Electrical and Electronic Engineers) 1394, PCMCIA (Personal Computer Memory Card International Association Architecture), or the like. Then, in step S110, the flow waits for the verification server to perform verification processing for the transmitted disk ID.

In step S111, the entertainment apparatus main unit 1 receives the results of the verification processing at the verification server. In the event that the results of the verification processing at the verification server are "Verified", a CD-ROM read-permitted command is received. In the event that the results of the verification processing at the verification server are "Not verified", the flow proceeds to step S112, and execution of the program is rejected and is force-quit.

In the event that the results of the verification processing at the verification server are "Verified", in step S113 the CPU of the entertainment apparatus main unit 1 executes the program stored in the CD-ROM. Processing following execution of the program will be described later with reference to FIG. 6.

FIG. 5 illustrates the processing at the verification server side in the first disk ID verification system according to the present embodiment. The basic processing at the verification server will be described here. When the user starts a game, information of the disk ID and device ID of the disk and device being used by the user are transmitted from the entertainment apparatus main unit 1 to the verification server 4. The verification server compares the received disk ID and device ID with user information stored in the user database 5 beforehand. There are four possible results of this comparison, as shown in FIG. 8.

No. 1: Both the disk ID and the device ID match that stored in the user database.

No. 2: Only the disk ID matches the stored.

No. 3: Only the device ID matches the stored.

No. 4: Neither the disk ID nor the device ID match the stored.

In the event that No. 1 is true, i.e., in the event that both the disk ID and the device ID that have been transmitted match the disk ID and the device ID already registered in the user database, judgment is passed that the disk is a valid disk and the use thereof is valid, so a program execution permission command is transmitted to the entertainment apparatus main unit 1.

In the event that No. 2 is true and the device ID does not match that stored in the database, in the event that No. 3 is true and the disk ID does not match that stored in the database, or in the event that No. 4 is true and neither the disk ID nor the device ID match that stored in the database, use of the disk is judged to be unauthorized, so a program execution rejection command is transmitted to the entertainment apparatus main unit 1.

In step S202, the verification server 4 performs connection verification with regard to the entertainment apparatus main unit 1 used by the user. In the event that the device ID of the apparatus main unit 1 is automatically supplied to the server 4 as part of the transmission data from the apparatus main unit 1, all that is necessary for the user is to enter the password that is the user ID. In the event that connection verification fails, in step S203, the connection between the user terminal device and the verification server is cut off. In the event that the connection verification is successful, the communication connection between the apparatus main unit 1 of the user and the server 4 is established in step S204.

In step S205, the verification server receives the disk ID data from the entertainment apparatus main unit 1. This is processing corresponding to step S109 in FIG. 4. Also, the verification server receives the device ID of the entertainment apparatus main unit 1 as part of the reception data from the entertainment apparatus main unit 1.

In step S206, the verification server compares the received disk ID and device ID with the user information (disk ID and device ID) recorded in the user database.

In step S207, judgment is made regarding whether or not the received disk ID matches the disk ID registered in the user database. In the event that the IDs match, the flow proceeds to step S208, where judgment is made regarding whether or not the received device ID matches the device ID registered as the device using the received disk ID.

In the event that the received disk ID and device ID match the disk ID and device ID registered in the user database, the flow proceeds to step S209, and the verification server 4 transmits a program execution permission command to the entertainment apparatus main unit 1.

In either of the cases of the disk IDs not matching in step S207 or the device IDs not matching in step S208, the flow proceeds to step S210, and the verification server 4 transmits a program execution rejection command to the entertainment apparatus main unit 1.

The method of registering disk ID into the verification server is not limited to the method described above. Further, there is a particular case where a provider of recording media such as optical disks provides verification servers as well. In this case, regarding the recording media that the provider manufactures and provides, the provider may register and store their disk IDs into the database 5 of the verification server 4, which they provide. In such a case, the first disk verification system does not need to register a disk ID when the disk is used for the first time.

The provider of the recording media gives a individual serial number to every disk upon manufacturing and then builds the number as a disk ID into that disk 2. Concurrently, those disk IDs (serial numbers) are recorded in the user database 5. Similarly, an individual serial number is given to every entertainment apparatus upon manufacturing and then the number is built as a device ID into that entertainment apparatus 1. Concurrently, those device IDs (serial numbers) are recorded in the user database 5.

In this case, upon shipping of the disks 2 from the factory, the disk IDs have not been interrelated to the device IDs of the entertainment apparatuses yet.

In event that a user of such a disk 2 requests connection and verification processing to the verification server 4 (S109), the verification server 4 performs verification of the disk ID following verification of the device ID.

Since the user database 5 contains the device ID and the disk ID (user information) recorded beforehand, the verification server 4 checks whether the device ID—disk ID received from the entertainment apparatus 1 correspond to the user information stored in the user database 5.

If the result indicates that there is nothing corresponding to the user information of the user database 5, then the verification processing is forcedly terminated and execution of the program stored in the disk 2 is rejected. In this situation, if the database 5 is configured to accumulate unauthorized ID's therein, it becomes possible to manage unauthorized disks, such as keeping a count of the number of times that the verification server 4 has been accessed by unauthorized disks, identification of the entertainment apparatuses utilizing unauthorized disks, and so on.

In addition to the rejection of unauthorized disks, the network system of the present invention can advantageously utilize a count of the number of times accessed by use of a disk 2 with a given disk ID. More particularly, the system utilizes a count of access to the verification server 4 so that when the access count exceeds a predetermined value, the verification processing is forcedly terminated and execution of the program stored in the disk 2 is rejected.

For example, by managing the count of access to the verification server 4 by use of a disk 2 with a given disk ID, it is possible to provide a trial period during which a user is allowed to utilize certain content, such as the program stored in the disk 2. In other words, a user can enjoy games, services and so on for the trial period, i.e., until the disk 2 is utilized a predetermined number of times.

Currently, in many types of trial versions of Internet connection services software applications, the trial period is set so as to count a time interval of utilization. According to the network system of the present invention, however, service management based on the number of times of utilization can be made rather than management based on the time interval of utilization.

For example, this is applied to a service offering download of music or pictures from a content server 6 to an entertainment apparatus 1 through the verification server 4. In this case, the disks 2 for utilizing the service are distributed from the service provider to users subscribing to the service. In each of the disks, a disk ID given to that disk, a verification program, a download execution program and so on are stored. By loading the disk 2 into the entertainment apparatus 1, the user is allowed to connect to the verification server 4 and the content server 6 to execute the downloading of music, pictures and so on.

In this situation, if the verification server 4 counts the number of times that a download is executed as the number of times that the content server 6 is accessed by use of the disk with the given disk ID, limitation of access to the service can be realized depending on the number of times rather than the time interval of downloading (communication time).

Additionally, if information representing items of content accessed by each of the users is correlated with user information (apparatus ID, user ID, disk ID and so on) in the verification server 4 and the correlated information is accumulated in the database 5, then management of each user regarding preferences and so on may be facilitated. By utilizing such accumulated information, the service provider or content provider can provide appropriate advertisements and so on to respective individual users through a communication network such as the Internet. For example, in the event that a user downloads certain car-type characters from the Company AAA, it is possible to provide a catalog or the like of actually-existing car models corresponding to the downloaded characters, thereby to achieve efficient sales promotion.

In this way, information regarding particulars of users can be accumulated in the verification server through distribution of content. This information can be utilized to provide useful and careful information or advertisements to users.

The above mentioned method for limiting utilization of offered services and so on is based on the number of times that the services are utilized, but other methods for limiting utilization may be used. For example, the service provider may also provide content stored in the disk 2 with the given disk ID, by putting limitation based on a sum of money collected from the user. Now, it is assumed that content stored in the disk 2 are not wholly available, but partly. When the user wants to utilize the partly unavailable content, the user has to pay the provider the money depending on content that the user wants to utilize. Upon receipt of payment, the service provider permits utilization by the user.

For example, assuming that content stored in a disk 2 is partly encrypted, a user that has not paid a fee for utilization is not permitted to utilize the encrypted portion, whereas a user that has paid the fee is permitted to utilize it using a key for decryption which is provided to the entertainment apparatus 1 from the service provider. Information to be sent from the service provider to the entertainment apparatus 1 is not limited to the decryption key.

What the user has to do in order to utilize the partly unavailable content stored in the disk 2 is not limited to payment of the fee for utilization, but it may be, for example, sending of the user ID to the verification server 4 which is operated by the service provider. This user ID is an ID given to the user by the service provider.

Figure 6:
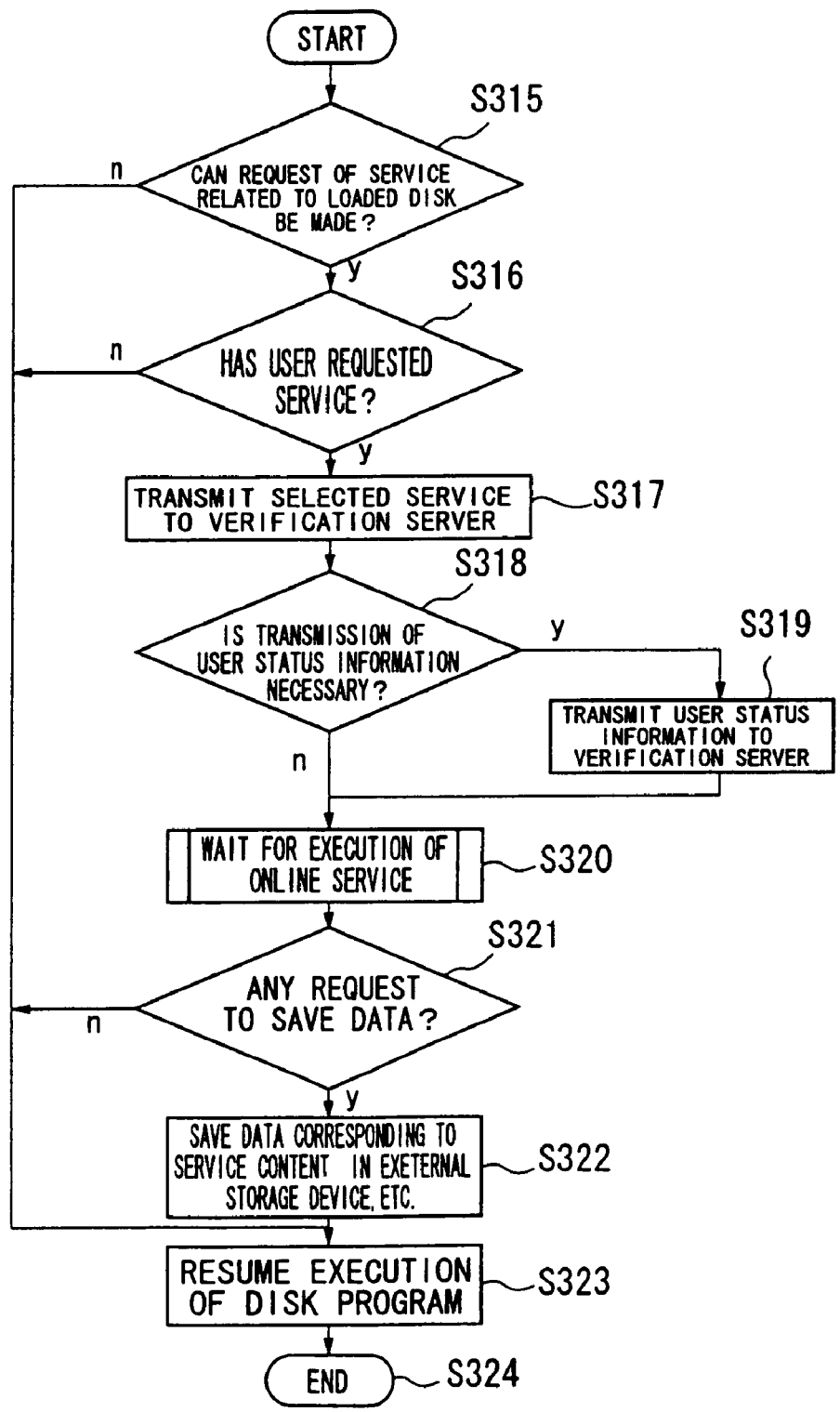
FIG. 6 is a processing flowchart for the apparatus main unit side for providing information correlating to a disk ID.

FIG. 6 illustrates the processing at the entertainment apparatus main unit 1 side in an online service system.

In step S315, a judgment is made regarding whether or not a service request relating to the optical disk loaded in the entertainment apparatus main unit 1 can be made. Specifically, the user can make a service request relating to the disk and receive the services requested online, as long as conditions hold such as: (1) that at the disk side, a program for performing connection to a portal site which the verification server manages has been written in the program in the disk beforehand; (2) that at the verification server side, the verification server manages and updates information relating to the disk which the user is using; and so forth. In the event that services can be used, the user can tell the specific content relating to the service from the content displayed on the display screen on the monitor (see FIG. 3). In the event that services can be requested, the flow proceeds to step S316, and otherwise execution of the program resumes in step S323.

In step S316, a judgment is made regarding whether or not the user has requested a service. In the event that there is a request for a service, the flow proceeds to step S317, and in the event that there is no request for service, execution of the program resumes in step S323.

In step S317, the entertainment apparatus main unit 1 transmits the service requested (selected) to the verification server 4, based on the online service user request from the user.

In step S318, a judgment is made regarding whether or not status information of the user side is necessary at the verification server 4 side in order to obtain services. For example, in the event that the user requests an upgrade, debugging, etc., for a racing game program, the verification server side will need data recorded in the loaded disk 2, such as the program serial No. and manufacturing history (version or revision), as well as data of partway-through games. Conversely, in the event of registering rankings of scores, entering for prizes, etc., such data would not be necessary. In the event that a judgment is made that the status information of the user side is necessary, the flow proceeds to step S319, and otherwise the flow proceeds to step S320.

In step S319, the CPU 16 of the entertainment apparatus main unit 1 reads the data relating to the loaded disk 2, and transmits this to the verification server 4. In step S320, the flow waits for execution of the online service at the verification server 4.

In step S321, a judgment is made regarding whether or not to store the data received from the verification server 4. For example, the user operates the controller 10 following the display on the monitor connected to the entertainment apparatus main unit 1, and instructs whether or not storing is necessary. In the event that there is the need to store the data, the flow proceeds to step S322, and otherwise the flow proceeds to step S323.

In the event that a judgment has been made that there is the need to store the data, in step S322 the entertainment apparatus main unit 1 saves the data in an external storage device, such as the memory card 11 or the like.

In step S323, the entertainment apparatus main unit 1 resumes execution of the program data stored in the disk. In this case, the program is executed with the data content downloaded from the verification server 4 reflected therein (e.g., the program subjected to upgrading or debugging).

Figure 7:
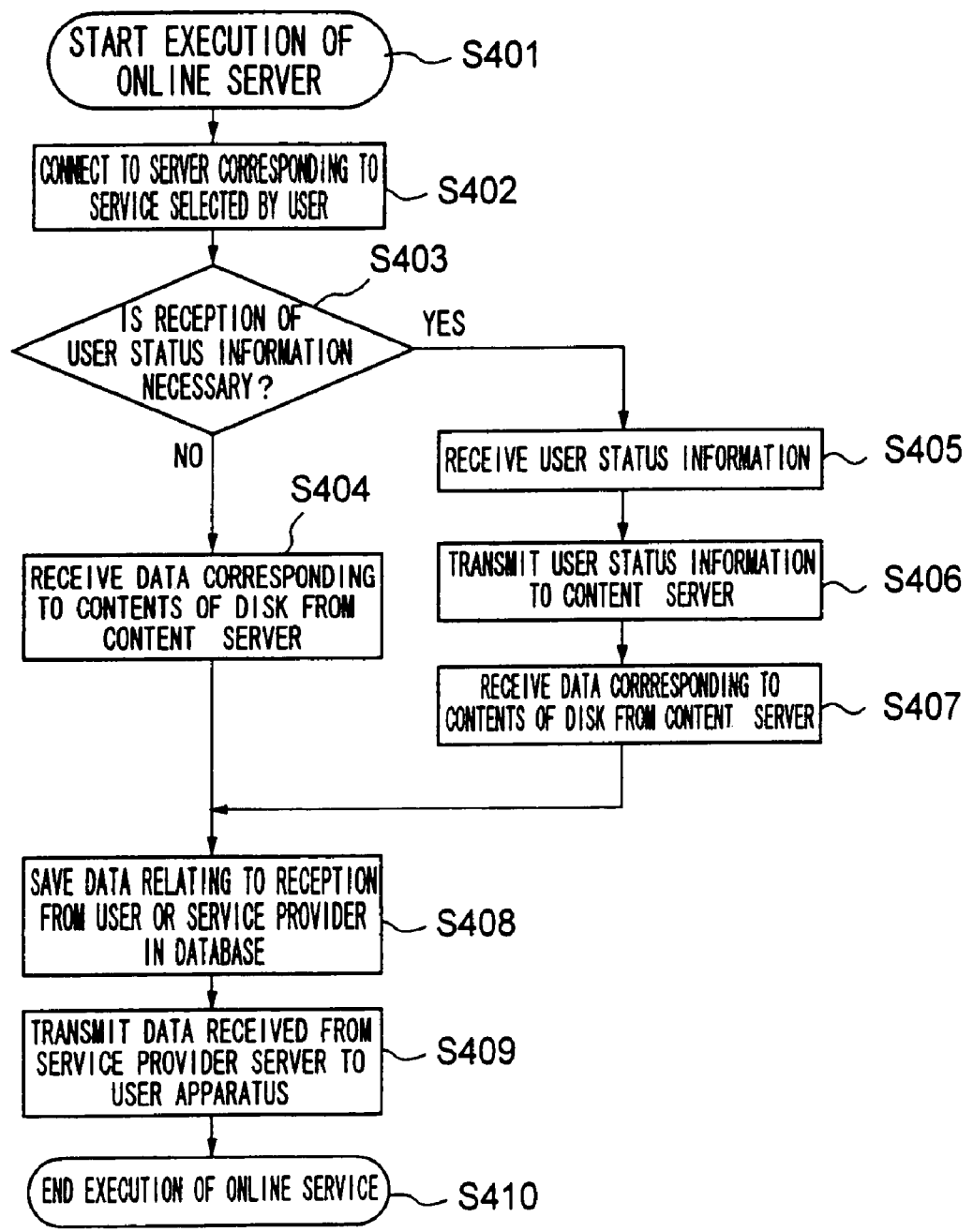
FIG. 7 is a processing flowchart for the verification server side for providing information correlating to a disk ID.

FIG. 7 is a diagram describing the processing at the host service side in the online service system.

In step S402, the verification server 4 connects to the content server 6 corresponding to the service which the user has selected, in accordance with the processing in step S317 in FIG. 6. The verification server 4 centrally manages the content servers 6 of the corporations cooperating with this business model, and accordingly establishes a connection with the content server 6 of the corporation providing the service based on the service selected by the user.

In step S403, the verification server 4 judges whether or not status information of the user side is necessary at the verification server 4 side in order to provide the service which the user has requested, as processing corresponding to step S318 in FIG. 6. In the event that this is unnecessary, the data necessary for the service requested by the user in step S204 is received from the content server 6. Note that the verification server 4 itself may provide the data. That is to say, an arrangement may be made wherein the verification server 4 takes in content from a database connected to itself, and provides these to the user side.

In the event that status information is necessary, the verification server 4 receives data of status information and the like from the entertainment apparatus main unit 1 at the user side in step S405, in accordance with the processing in step S319 in FIG. 6. For example, in the event that the user is requesting an upgrade, debugging, etc., for a racing game program, the status data will include data recorded in the loaded disk 2 such as the program serial No. and manufacturing history (version or revision), data of partway-through games, and so forth.

In step S406, the verification server 4 transmits the status data received from the apparatus main unit 1 at the user side to the content server 6 providing the service which the user has selected. In step S407, the verification server 4 receives data based on the service content requested by the user from the content server 6. As mentioned above, the data may be provided by the verification server 4 itself.

The content server 6 obtains the status information of the user, i.e., data recorded in the loaded disk 2, such as the program serial No. and manufacturing history (revision), data of partway-through games, and so forth. Accordingly, the content server 6 can transmit data corresponding to the status information of the user to the user via the verification server 4.

In step S408, the verification server 4 registers and manages in the user database 5, data relating to the processing between the verification server 4 and the entertainment apparatus main unit 1 and content server 6. The disk ID of the disk used by the user, the device ID of the apparatus main unit 1, the user ID and other user information are all centrally managed by the verification server 4. The servers providing the various types of services that have connected to the verification server 4 only receive transmission of the absolutely minimum data necessary for exchanging data, such as request commands and the like. Thus, personal information of users can be prevented from leaking, and the security of the present system is increased.

In step S409, the verification server 4 transmits the data received from the servers providing the various types of services to the apparatus main unit 1 of the user. The transmitted data is stored in the storage devices such as the main memory 17, memory card 11, etc., at the entertainment apparatus main unit 1 side.

Thus, according to the present embodiment, processing such as upgrading and debugging and the like is performed based on information such as disk IDs unique to each disk 2, user status, and so forth, so consequently high-quality services can be provided.

Note that the user ID unique to each user can be used instead of the device ID. In this case, the user ID can also be used in the form of a password.

Also, the disk ID, device ID, user ID, etc., can be used instead of status information. That is to say, in the event that there is a request for data to the verification server 4 from the entertainment apparatus main unit 1, the verification server 4 can identify programs and/or data within the disk 2 based on the disk ID and the like, and prepare data suitable for the programs and the like. Now, in the event that a device ID is used instead of the status information, programs within the disk 2 are identified as programs executable by the entertainment apparatus main unit 1, and in the event of using the user ID instead of the status information, programs within the disk 2 are identified as programs which can be used by the user (i.e., use thereof is permitted, age restrictions are not applicable, and so forth). Accordingly, combining various types of IDs or combining various types of IDs with the status information allows the programs and the like within the disk 2 to be identified even more accurately, so data more suitable for the programs and the like can be prepared.

The flowchart described in the present embodiment can be provided as a computer-readable and computer-executable program recorded on a recording medium.

According to the embodiment of the present invention, a system enabling mutual exchange of information between users and digital content for each individual disk can be provided.

Also, according to the embodiment of the present invention, a system enabling mutual exchange of information between users and digital content in a manner corresponding to each individual recording medium such as optical disk can be provided, by suitably constructing a network system wherein management of verification of user IDs, device IDs, and disk IDs is performed at a verification server, and the verification server and other necessary content servers are connected.

Also, in the event that the status of the disk can be identified by any one of the disk ID (recording medium ID), the device ID, or the user ID, verification processing can be carried out with that ID alone.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A computer system comprising:

a plurality of user computers each capable of being loaded with a recording medium having a unique recording medium ID;

a verification server connected with the user computers via a network, the verification server including a user database provided with the unique recording medium IDs; and at least one content server connected to the verification server via a network and having a content database associated therewith;

wherein the verification server is operable to:

require the recording medium ID from the user computers when the user computers request data associated with a desired content server and for verifying the request based on information recorded in the user database;

establish communications between the user computers and the desired content server when the request is verified;

request user status information from the user computers representing data of partway-through games and data stored in at least one of the recording medium and the user computer from the user computers and for transmitting the user status information to the desired content server; and receive information corresponding to the user status information from the content database of the desired content server and for transmitting content information from the desired content server to the user computers to thereby provide the content requested by the user computers and upgrading or debugging programs based on the user status information of individual user computers.

2. A computer system according to claim 1, wherein the user status information comprises at least one of a serial number and a version number of a program.

3. A computer system according to claim 1, wherein the user status information comprises data indicative of the completion status of a game played on the user computer.

4. A computer system according to claim 1, wherein the content information transmitted to the user computer comprises data for upgrading at least one of the programs and data.

5. A computer system according to claim 1, wherein the content information transmitted to the user computer comprises data for debugging at least one of the programs and data.

6. A computer system according to claim 1, wherein:
the user computers further comprise means for supplying to the verification server the user status information.

7. A computer system according to claim 1, wherein:
the user computers each have unique device IDs;
the user database contains information relating to the device IDs; and
the verification server further comprises:
   means for obtaining the device IDs from the user computers when the user computers request the data from the desired content server; and
   means for identifying the user computers based on the device IDs and the user information in the user database.

8. A computer system according to claim 1, wherein:
each user of each of the user computers has a unique user ID;
the user database contains information relating to the user IDs; and
the verification server further comprises:
   means for obtaining the user IDs from the user computers when the user computers request the data from the desired content server; and
   means for identifying the user based on the user ID and the user information in the user database.

9. A computer system according to claim 1, wherein the verification server is connected, via a network, to at least one content server having digital content.

10. A computer system according to claim 9, wherein the verification server further comprises:
means for performing verification of the recording medium based on the recording medium ID; and
means for determining whether or not to permit providing of the digital content from the content server to the user computer, based on the results of the verification.

11. A computer system comprising:
a plurality of user computers each capable of being loaded with a recording medium storing at least one of programs and data;
a verification server connected with the user computers via a network; and
at least one content server connected to the verification server via a network and having a content database associated therewith;
wherein the user computers each comprise means for supplying to the verification server user status information representing data of partway-through games and data stored in at least one of the recording medium and the user computer; and
the verification server is operable to:
   obtain the user status information from the user computers when the user computers request data associated with a desired content server connected to the verification server;
   prepare the requested data according to the user status information; and
   transmit the requested data to the user computers to thereby provide the data requested by the users and upgrading or debugging programs based on the user status information of individual user computers.

12. A computer system according to claim 11, wherein said requested data is data for updating at least one of programs and data stored in said recording medium.

13. A computer system according to claim 11, further comprising at least one content server having digital content,
wherein the means for preparing the requested data comprises means for sending the user status information to the content server, and
wherein the content server comprises means for selecting the digital content according to the user status information and transmitting the selected digital content to the verification server.

14. A computer system comprising:
a plurality of user computers each capable of being loaded with a recording medium storing at least one of programs and data; and
a verification server connected with the user computers via a network, wherein:
each of the user computers has a unique device ID; and
the verification server comprises:
   a user database provided with user status information corresponding to the device IDs; and the verification server is operable to
   require the device IDs from the user computers when the user computers request data associated with a desired content server connected to the verification server;
   identify the user computer based on the device ID and the user status information in the user database;
   request user status information from the user computers representing data of partway-through games and data stored in at least one of the recording medium and user computer from the user computer and for transmitting the user status information to the desired content server;
   prepare the requested data according to the identified user computer and the user status information; and
   transmit the requested data to the user computers to thereby provide the data requested by the users and upgrading or debugging programs based on the user status information of individual user computers.

15. A computer system comprising:
a plurality of user computers each capable of being loaded with a recording medium storing at least one of programs and data; and
a verification server connected with the user computers via a network, wherein:
each user of each of the user computers has a unique user ID; and
the verification server further comprises:
   a user database provided with user status information corresponding to the user IDs; and the verification server is operable to
   require the user IDs from the user computers when the user computers request data associated with a desired content server connected to the verification server;
   identify the user based on the user ID and the user status information in the user database;
   request user status information from the user computers representing data of partway-through games and data stored in at least one of the recording medium and the user computer from the user computer and for transmitting the user status information to the desired content server;
   prepare the requested data according to the identified user and the user status information; and
   transmit the requested data to the user computers to thereby provide the data requested by the users and upgrading or debugging programs based on the user status information of individual user computers.

16. A verification server capable of being connected, via a network, with a plurality of user computers each capable of being loaded with one or more recording media each having a unique recording medium ID, the verification server comprising:
   a user database provided with user status information corresponding to the recording medium IDs; wherein the verification server is operable to:
   require the recording medium IDs from the user computers when the user computers request data associated with a desired content server connected to the verification server;
   identify a given recording medium based on the recording medium ID and the user status information in the user database;
   request user status information from the user computers representing data of partway-through games and data stored in at least one of the recording media and the user computer from the user computer and for transmitting the user status information to the desired content server;
   prepare the requested data according to the identified recording medium and the user status information; and
   transmit the requested data to the user computers to thereby provide the data requested by the users and upgrading or debugging programs based on the user status information of individual user computers.

17. A method of operating a computer system comprising a plurality of user computers each capable of being loaded with a recording medium having a unique recording medium ID, a verification server connected with the user computers via a network and including a user database provided with the unique recording medium IDs, and at least one content server connected to the verification server via a network and having a content database associated therewith, wherein the method comprises:
   requiring the recording medium ID from the user computers when the user computers request data associated with a desired content server connected to the verification server;
   verifying the request based on information recorded in the user database;
   establishing communications between the user computer and the desired content server when the request is verified;
   requesting user status information from the user computers representing data of partway-through games and data stored in at least one of the recording medium and the user computer from the user computer;
   transmitting the user status information to the desired content server;
   receiving information corresponding to the user status information from the content database of the desired content sever; and
   transmitting content information from the desired content server to the user computer to thereby provide the content requested by the user computers and upgrading or debugging programs based on the user status information of individual user computers.

18. A method of operating a computer system comprising a plurality of user computers each capable of being loaded with a recording medium storing at least one of programs and data, a verification server connected with the user computers via a network, and at least one content server connected to the verification server via a network and having a content database associated therewith, wherein the method comprises:
   obtaining user status information from the user computer representing data of partway-through games and data stored in at least one of the recording medium and the user computer from the user computers when the user computers request data associated with a desired content server connected to the verification server;
   preparing the requested data according to the user status information; and
   transmitting the requested data to the user computer to thereby provide the data requested by the users and upgrading or debugging programs based on the user status information of individual user computers.

19. A user computer capable of being loaded with a recording medium storing at least one of programs and data, and capable of being connected with a verification server via a network, the verification server being connected to at least one content server via a network and having a content database associated therewith, and the recording medium having a unique ID, the user computer being operable to:
   supply at least one of an ID unique of the user computer, an ID unique of the recording medium and an ID unique of the user, to the verification server as verification information, when a request for data associated with a desired content server is made by a user;
   supply user status information representing a current status of the at least one of programs and data stored in at least one of the recording medium and the user computer to the verification server;
   receive a result of verification from said the verification server; and
   receive content information corresponding to the user status information from the desired content server.

20. A storage medium for use with a computer system, which computer system comprises a user computer connectable via a network to a server, a recording medium storing at least one of programs and data and being capable of being loaded into the user computer, a verification server connected with the user computer via a network, and at least one content server connected to the verification server via a network and having a content database associated therewith, wherein the storage medium contains a program capable of causing the user computer to:

send the recording medium ID to the verification server when the user computer requests data associated with a desired content server;

establish communications between the user computer and the desired content server via the verification server when the request is verified by the verification server;

send user status information from the user computers representing data of partway-through games and data stored in at least one of the recording media and the user computer to the desired content server; and receive content information corresponding to the user status information from the desired content server in response to the request for data and upgrading or debugging programs based on the user status information of individual user computers.

21. A storage medium containing a program for use with a computer system, the computer system comprising a plurality of user computers each capable of being loaded with a recording medium having a unique recording medium ID, a verification server connected with the user computers via a network and including a user database provided with the unique recording medium IDs, and at least one content server connected to the verification server via a network and having a content database associated therewith, wherein the program is capable of causing the verification server to:

require the recording medium ID from the user computers when the user computers request data associated with a desired content server;

verify the request based on information recorded in the user database;

establish communications between the user computer and the desired content server when the request is verified;

request user status information from the user computers representing data of partway-through games and data stored in at least one of the recording media and the user computer from the user computer;

transmit the user status information to the content server;

receive information corresponding to the user status information from the desired content database; and transmit content information from the desired content server to the user computer to thereby provide the content requested by the user computers and upgrading or debugging programs based on the user status information of individual user computers.

22. A storage medium containing a program for use with a computer system, the computer system comprising a plurality of user computers each capable of being loaded with a recording medium storing at least one of programs and data, a verification server connected with the user computers via a network and including a user database provided with unique information associated with at least one of an ID unique of the user computer, an ID unique of the recording medium and an ID unique of the user, and at least one content server connected to the verification server via a network and having a content database associated therewith, wherein the program is capable of causing the verification server to:

require verification information from the user computers when the user computers request data associated with a desired content server;

verify the request based on information recorded in the user database;

establish communications between the user computer and the desired content server when the request is verified;

request user status information from the user computers representing data of partway-through games and data stored in at least one of the recording media and the user computer from the user computer;

transmit the user status information to the desired content server;

receive information corresponding to the user status information from the content database of the desired content server; and transmit content information from the desired content server to the user computer to thereby provide the content requested by the user computers and upgrading or debugging programs based on the user status information of individual user computers.

\* \* \* \* \*

UNITED STATES PATENT AND TRADEMARK OFFICE
CERTIFICATE OF CORRECTION

PATENT NO. : 7,447,783 B2
APPLICATION NO. : 10/061982
DATED : November 4, 2008
INVENTOR(S) : Kutaragi et al.

It is certified that error appears in the above-identified patent and that said Letters Patent is hereby corrected as shown below:

Column 1, line 13, "have, only" should read --have only--.

Column 14, line 62, "is operable to" should read --comprises--.

Column 14, line 63, "require" should read --means for requiring--.

Column 15, line 1, "establish" should read --means for establishing--.

Column 15, line 4, "request" should read --means for requesting--.

Column 15, line 10, "receive" should read --means for receiving--.

Column 16, line 15, "is operable to" should read --comprises--.

Column 16, line 16, "obtain" should read --means for obtaining--.

Column 16, line 20, "prepare" should read --means for preparing--.

Column 16, line 22, "transmit" should read --means for transmitting--.

Column 16, line 49, "is operable to" should read --comprises--.

Column 16, line 50, "require" should read --means for requiring--.

Column 16, line 53, "identify" should read --means for identifying--.

Column 16, line 55, "request" should read --means for requesting--.

Column 16, line 62, "prepare" should read --means for preparing--.

Signed and Sealed this
Twelfth Day of March, 2013

Teresa Stanek Rea
*Acting Director of the United States Patent and Trademark Office*

Column 16, line 64, "transmit" should read --means for transmitting--.

Column 17, line 47, "request" should read --means for requesting--.

Column 17, line 53, "prepare" should read --means for preparing--.

Column 17, line 55, "transmit" should read --means for transmitting--.

Column 18, line 49, "being operable to" should read --comprising--.

Column 18, line 50, "supply" should read --means for supplying--.

Column 18, line 55, "supply" should read --means for supplying--.

Column 18, line 55, delete "representing a current status of the at least one of programs" and insert --from the user computers representing data of partway-through games--.

Column 18, line 59, "receive" should read --means for receiving--.

Column 18, line 61, "receive" should read --means for receiving--.

Column 18, line 62, after "server" insert --and upgrading or debugging programs based on the user status information of individual user computers--.